United States Patent [19]

Ferschl et al.

[11] Patent Number: 5,196,866
[45] Date of Patent: Mar. 23, 1993

[54] FOCUS FIBER MOUNT

[75] Inventors: Michael S. Ferschl; James A. Cutaia, both of Rochester; Eileen M. Kemp, Livonia; Joseph Y. Kaukeinen, Rochester; Erich Zielinski, Bergen, all of N.Y.

[73] Assignee: Eastman Kodak Company, Rochester, N.Y.

[21] Appl. No.: 670,095

[22] Filed: Mar. 15, 1991

[51] Int. Cl.[5] .............................................. H04N 1/21
[52] U.S. Cl. .................................................... 346/108
[58] Field of Search ................. 346/107 R, 76 L, 108, 346/160, 1.1

[56] References Cited

U.S. PATENT DOCUMENTS

| 4,389,655 | 6/1983 | Baues | 346/107 |
|---|---|---|---|
| 4,703,334 | 10/1987 | Mochimaru et al. | 346/160 |
| 4,748,456 | 5/1988 | Luoma et al. | 346/107 |
| 4,820,013 | 4/1989 | Fuse | 350/96.27 |
| 4,875,057 | 10/1989 | Hediger et al. | 346/107 |
| 5,087,927 | 2/1992 | Thomas et al. | 346/108 |

Primary Examiner—Mark J. Reinhart
Attorney, Agent, or Firm—Robert L. Randall

[57] ABSTRACT

In an imaging apparatus utilizing a rotating carrier member arranged to carry a writing element, a source of light is provided which is movable with respect to the writing element to project a writing beam of light onto the writing element to generate an image. The source of light comprises a plurality of laser diodes and a plurality of optical fibers connecting the diodes to a movable writing head adjacent the carrier member, with the optical fibers in the writing head have output ends arranged in a linear array. The improvement comprises a substantially planar support substrate disposed in the writing head arranged to support the output ends of the optical fibers on a first surface thereof. The substrate is provided with a plurality of grooves on the first surface with each groove receiving the output end of an individual fiber. A focusing arrangement is provided for focusing the writing beam with respect to the writing element and comprises a laser diode for generating a focusing beam of light to be projected onto the writing element, and a photocell. A focusing optical fiber connects the focusing diode to the writing head, with the end of the focusing optical fiber at the writing head being supported on the opposite surface of the substrate from the first surface substantially centrally of the linear array of the writing beam optical fibers.

29 Claims, 3 Drawing Sheets

FOCUS FIBER MOUNT

BACKGROUND OF THE INVENTION

1. Field of the Invention

The present invention relates to a color proofing apparatus which utilizes an electronic signal input, and more particularly, to a method and apparatus for focusing a writing beam in a thermal printer using lasers to provide thermal energy to a dye-donor which causes the dye to selectively transfer to a receiver to form the proof image.

2. Description of the Prior Art

Color-proofing is the procedure used by the printing industry for creating representative images that replicate the appearance of printed images without the cost and time required to actually set up a high-speed, high-volume printing press to print an example of the images intended. Ideally, these representative images, or proofs, are generated from the same color-separations used to produce the individual color printing plates used in printing presses so that variations in the resulting images can be minimized. Various color-proofing systems have been devised to create the proofs and have included the use of smaller, slower presses as well as means other than presses, such as photographic, electrophotographic, and non-photographic processes.

The proofs generated are judged for composition, screening, resolution, color, editing, and other visual content. The closer the proof replicates the final image produced on the printing press, as well as the consistency from image to image, from press to press, and from shop to shop, the better the acceptance of the proofing system by the printing industry. Other considerations used in judging proofing systems include reproducibility, cost of the system as well as cost of the individual proofs, speed, and freedom from environmental problems. Further, since nearly all printing presses utilize the half-tone process for forming pictorial images, wherein the original image is screened, i.e. photographed through a screen to produce one or more printing plates containing an image formed of a plurality of fine dots that simulate the varying density of the original image, proofing processes that employ the half-tone process to form an image are more acceptable to the printing industry than are continuous tone systems.

In recent years a variety of processes have been developed and implemented to electronically form, store, and manipulate images both for the actual printing as well as the proofing of images. While such electronic systems can handle and produce analog images, the most widely used systems employ digital processes because of the ease of manipulation of such digital images. In each of these electronic processes it is possible to display the resulting image on a CRT display, but it is generally necessary to produce a "hard copy" (i.e. an image actually formed on a sheet of paper or other material) before it can be fully assessed for approval of the final printing operation. Thus, each of these electronic systems requires the use of some form of output device or printer which can produce a hard copy of the image for actual evaluation. It is to the field of proofing output devices that the present invention is directed.

While purely photographic processes can provide accurate reproductions of images, they do not always replicate the reproduction resulting from printing presses. Further, most photographic processes do not produce half-tone images that can be directly compared to the printed images they are supposed to simulate. Moreover, they are almost universally incapable of reproducing the images on the wide variety of paper or other material that can be run through a press. It is known that the appearance of the final printed image is affected by the characteristics of the paper or other material upon which it is printed. Thus, the ability to form the proof image on the material actually to be used in the press can be a determining factor in the selection of the proofing system.

Other continuous tone proofing systems, such as thermal processes and ink-jet systems have been developed, but they do not replicate the half-tone images so desired by the printing industry.

Electrophotographic proofing systems with half-tone capability have been introduced over the past few years which employ either wet or dry processes. The electrophotographic systems that use dry processes suffer from the lack of high resolution necessary for better quality proofing, particularly when the images are almost of continuous tone quality. This results from the fact that dry electrophotographic processes cannot employ toner particles which have a sufficiently small size to provide the requisite high image resolution. While wet electrophotographic processes do employ toners with the requisite small particle size, they have other disadvantages such as the use of solvents that are environmentally undesirable.

In commonly assigned U.S. patent application Ser. Nos. 451,655 and 451,656, both filed Dec. 18, 1989, a thermal printer is disclosed which may be adapted for use as a direct digital color proofer with half-tone capabilities. This printer is arranged to form an image on a thermal print medium in which a donor element transfers a dye to a receiver element upon receipt of a sufficient amount of thermal energy. This printer includes a plurality of diode lasers which can be individually modulated to supply energy to selected areas of the medium in accordance with an information signal. The printhead of the printer includes one end of a fiber optic array having a plurality of optical fibers coupled to the diode lasers. The thermal print medium is supported on a rotatable drum, and the printhead with the fiber optic array is movable relative to the drum. The dye is transferred by sublimation to the receiver element as the radiation, transferred from the diode lasers to the donor element by the optical fibers, is converted to thermal energy in the donor element.

A direct digital color proofer utilizing a thermal printer such as that just described must be capable of consistently and accurately writing minipixels at a rate of 1800 dots per inch (dpi) and higher to generate half-tone proofs having a resolution of 150 lines per inch and above, as is necessary to adequately proof high quality graphic arts images such as those found in high quality magazines and advertisements. Moreover, it is necessary to hold each dot or minipixel to a density tolerance of better than 0.1 density unit from that prescribed in order to avoid visible differences between the original and the proof. This density control must be repeatable from image-to-image and from machine-to-machine. Moreover, this density control must also be maintained in each of the colors being employed in multiple passes through the proofer to generate a full color image.

Aspects of the apparatus which affect the density of the dots that make up the image include such things as variations and randomness of the intensity and frequency of the laser output, and variations in the output of the fiber optics which can vary from fiber to fiber and even within a single fiber as it is moved during the writing process. Variations in the finish of the drum surface as well as drum runout and drum bearing runout and variations in the parallelism of the translation of the printhead with respect to the axis of the drum will also affect the density of the image dots. The difference in the distance between the ends of individual fibers and the drum surface also affects image density because of the fact that the end of the fiber bundle is flat while the surface of the drum is curved. Temperature variations in the printhead due to the ambient temperature of the machine as well as the fact that the writing process itself heats the printhead also influence the image density.

Variations in the print medium elements, such as variations in the thickness of the donor and receiver elements as well as the various layers that are a part thereof, can also affect the image density as it is being written.

SUMMARY OF THE INVENTION

Thus, it has been found necessary to continuously focus the writing beam as the image is being formed to assure that variations in the thickness of the donor and receiver elements, as well as other perturbations in the system, do not defocus the writing beam and adversely affect the image density or the sharpness of the image. Attempts have been made to utilize reflections of the writing beam from the top surface of the donor element to affect an autofocus control of the writing beam but variations in the thickness of the donor element itself have led to less than satisfactory results. Further, because of the total power being produced by the multichannel writing array, e.g. 20 channels, each operating at a power level of 200 milliwatts, it is easy to overwhelm any focusing beam reflected from the writing element and to flood the photo-detector with the reflected writing beam. Still further, it has been found that, in thermal writing systems such as presently described, the process of writing or generating an image by heating the donor element can adversely affect the optical characteristics of the donor sheet through which the focusing beam must be transmitted. Thus, it has been discovered that improved focusing of the writing beam can be obtained if the focusing beam is directed to the donor element ahead of the writing beam. In this manner, the focusing beam can be transmitted through the donor element before it has been distorted by the thermal writing process. Accordingly, the focusing beam may more accurately determine the focusing position if it does not have to pass through a donor element that may have been optically distorted by the writing process.

Thus, a method and apparatus for separating the focusing beam from the writing beam at the focusing photo-detector of such a digital proofing apparatus would be technologicaly desirable and economically advantageous in that it facilitates the discrimination of the focusing beam from the writing beam. This is accomplished by physically separating the focusing beam from the writing beam at the writing head, at the writing element, and at the photo-detector. Moreover, this separation of the focusing beam from the writing beam permits the focusing beam to be projected onto the writing element ahead of the writing beam with the above-mentioned advantageous results.

Accordingly, the present invention provides, in an imaging apparatus utilizing a writing element, a movable writing head including means for generating a writing beam of light to be projected onto the writing element to generate an image, means for focusing the writing beam with respect to the writing element. The focusing means comprises means for generating a focusing beam of light to be projected onto the writing element and means for detecting the focusing beam. The improvement comprises means for spatially separating the focusing beam of light at the writing element from the writing beam of light at the writing element.

According to another embodiment of the present invention, in an imaging apparatus utilizing a writing element, a source of light is arranged to project a writing beam of light onto the writing element to generate an image. The source of light includes means for transferring the light to a movable writing head from whence it is projected onto the writing element. Means is provided for focusing the writing beam with respect to the writing element, with the focusing means comprising means for generating a focusing beam of light to be projected onto the writing element and means for detecting the focusing beam. The focusing beam generation means includes means for transferring the focusing beam of light to the movable writing head, with the improvement comprising means for spatially separating at the writing head the focusing beam transferring means and the writing beam transferring means whereby the focusing beam is projected onto the writing element in spaced relation with respect to the projection of the writing beam onto the writing element.

According to still another embodiment, in an imaging apparatus utilizing a rotating carrier member arranged to carry a writing element, a source of light is provided which is movable with respect to the writing element and is arranged to project a writing beam of light onto the writing element to generate an image. The source of light comprises a plurality of laser diodes and a plurality of optical fibers connecting the diodes to a movable writing head adjacent the carrier member, with the optical fibers in the writing head having output ends arranged in a linear array. The method of focusing the writing beam with respect to the writing element comprises the steps of generating a focusing beam of light, projecting the focusing beam from a location in the writing head spatially separated from but substantially centrally of the linear array onto the writing element, aiming the focusing beam ahead of the writing beam at the writing element, and reflecting the focusing beam from the writing element to a photocell where it remains separated from the writing beam.

According to yet another embodiment, in an imaging apparatus utilizing a rotating carrier member arranged to carry a writing element, a source of light is provided which is movable with respect to the writing element to project a writing beam of light onto the writing element to generate an image. The source of light comprises a plurality of laser diodes and a plurality of optical fibers connecting the diodes to a movable writing head adjacent the carrier member, with the optical fibers in the writing head having output ends arranged in a linear array. The improvement comprises a substantially planar support substrate disposed in the writing head arranged to support the output ends of the optical fibers on a first surface thereof. The substrate is provided with a plurality of grooves on the first surface with each groove receiving the output end of each fiber. Means is provided for focusing the writing beam with respect to the writing element, comprising a laser diode for generating a focusing beam of light to be projected onto the writing element and a photocell. A focusing optical fiber connects the focusing diode to the writing head, with the end of the focusing optical fiber at the writing head being supported on the opposite surface of the substrate from the first surface substantially centrally of the linear array of the writing beam optical fibers. Thus, the focusing beam is projected onto the writing element ahead of the writing beam and is separated from the writing beam when it is detected by the photocell.

Various means for practicing the invention and other features and advantages thereof will be apparent from the following detailed description of illustrative, preferred embodiments of the invention, reference being made to the accompanying drawings.

DESCRIPTION OF THE PREFERRED EMBODIMENT

Figure 1:
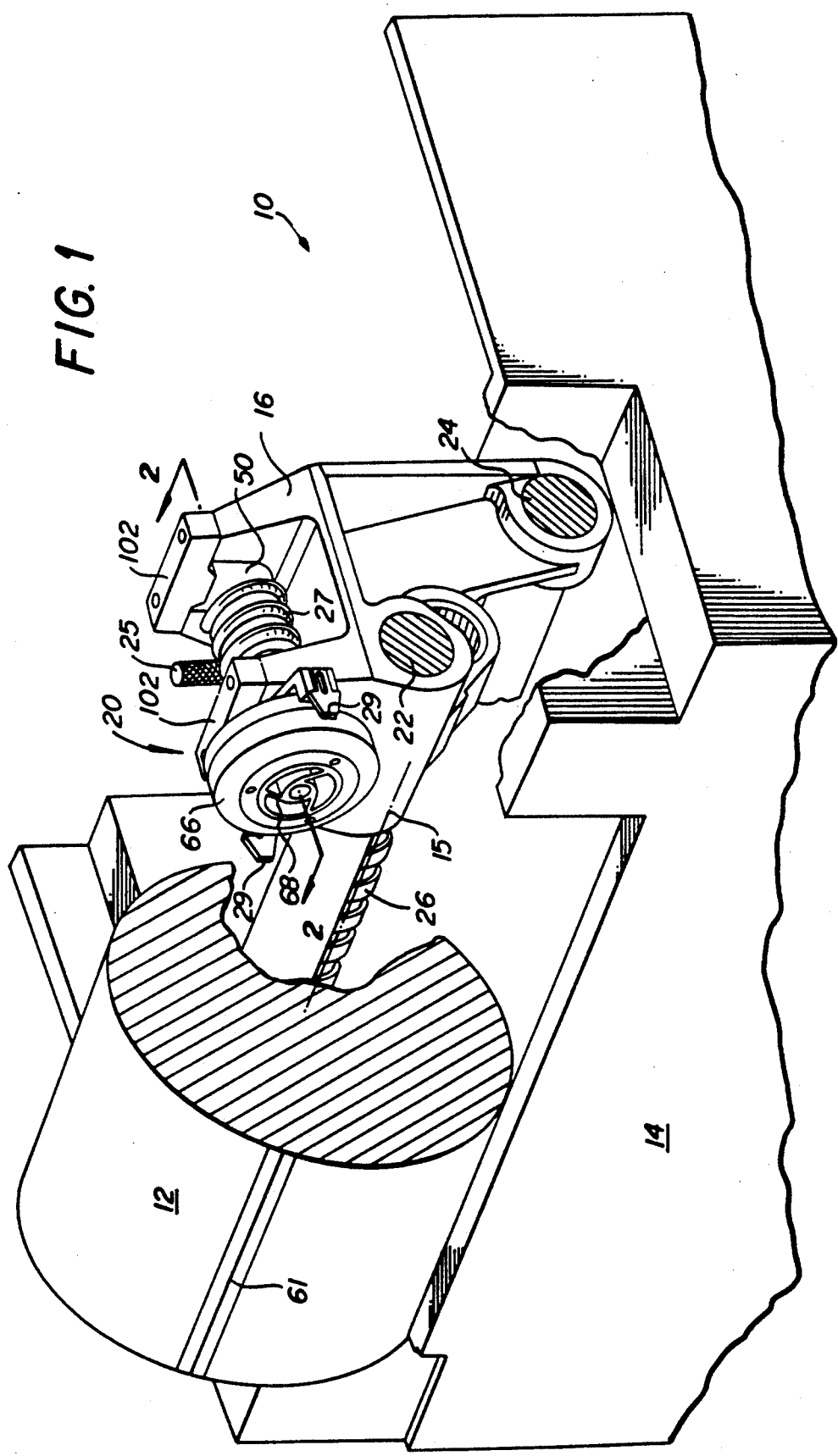
FIG. 1 is a perspective view of the imaging apparatus of the present invention, partially cut-away to reveal hidden portions thereof.

Referring now to FIG. 1, there is shown a thermal printer 10 comprising a drum member 12 mounted for rotation about an axis 15 in frame member 14. The drum member 12 is adapted to support a thermal print medium, not shown, of a type in which a dye is transferred by sublimation from a donor element to a receiver element as a result of heating the dye in the donor. The donor element and the receiver element are superposed in relatively intimate contact and are held onto the peripheral surface of the drum member by means such as by vacuum applied to the superposed elements from the drum interior. A thermal print medium for use with the printer 10 can be, for example, the medium disclosed in U.S. Pat. No. 4,772,582, which includes a donor sheet having a material which strongly absorbs at the wavelength of the exposing light source. When the donor element is irradiated, this absorbing material converts light energy to thermal energy and transfers the heat to the dye in the immediate vicinity, thereby heating the dye to its vaporization temperature for transfer to the receiver element. The absorbing material may be present in a layer beneath the dye, or it may be admixed with the dye and is strongly absorptive to light having wavelengths in the range of 800 nm–880 nm. An example of a preferred embodiment of a receiver element that can be used with the present invention is disclosed in co-pending, commonly assigned U.S. patent application Ser. No. 606,404, entitled Intermediate Receiver Opaque Support, and filed Oct. 31, 1990. The receiver element disclosed therein incorporates a reflective layer which improves the efficiency of the dye transfer to the receiver element.

The light source is movable with respect to the drum member and is arranged to direct a beam of actinic light to the donor element. Preferably the light source comprises a plurality of laser diodes (not shown) which can be individually modulated by electronic signals which are representative of the shape and color of the original image, so that each dye is heated to cause volatilization only in those areas in which its presence is required on the receiver to reconstruct the color of the original object. In the preferred embodiment, the laser diodes are mounted remotely from the drum member 12, on the stationary portion of the frame 14, and each direct the light produced thereby to the input end of a respective optical fiber which extends to and transfers the light to a movable writing head 20 adjacent the drum member. The laser diodes are selected to produce a first beam of light having wavelengths in the range of 800 nm–880 nm, and preferably predominately at a wavelength of 830 nm.

The writing head 20 is moveably supported adjacent drum member 12 and is mounted on a moving translator member 16 which, in turn, is supported for slidable movement on bars 22 and 24. The bars 22 and 24 are sufficiently rigid that they do not sag between the mounting points at their ends and are arranged as exactly parallel with the axis of the drum member as possible. The upper bar 22 is arranged to locate the writing head precisely adjacent the axis of the drum with the axis of the writing head perpendicular to the drum axis. The upper bar 22 locates the translator in the vertical and the horizontal directions with respect to the axis of the drum member. The lower bar 24 locates the translator member only with respect to rotation of the translator about the bar 22 so that there is no over-constraint of the translator which might cause it to bind, chatter, or otherwise impart undesirable vibration to the writing head during the generation of an image. The translator member 16 is driven by means of a motor (not shown) which rotates a lead screw 26 parallel to bars 22 and 24 to move the writing head parallel with the axis of the drum member. The coupling (not shown) which connects the translator member to the lead screw is carefully chosen so that the only force imparted to the translator by the lead screw is parallel to the drum axis.

The writing head 20 is removably mounted on the translator member 16 so that it automatically adopts the preferred orientation with respect to the drum axis noted above. The writing head is selectively locatable with respect to the translator, and thus with respect to the drum surface and axis, with regard to its distance from the drum surface, and with respect to its angular position about its own axis. Accordingly, a pair of adjustable locating means are provided to accurately locate the writing head with respect to these two axes on the translator member 16. Only one of the adjustable locating means, a micrometer adjustment screw 25, is illustrated, A torsion and compression spring 27 is provided to load the writing head against these locating means.

The end of the writing head 20 adjacent the drum member 12 is provided with a pair of photosensors 29 aimed at the surface of the drum member. The photosensors are disposed on diametrically opposite sides of the optical axis of the writing head in a fixed relationship thereto.

Figure 2:
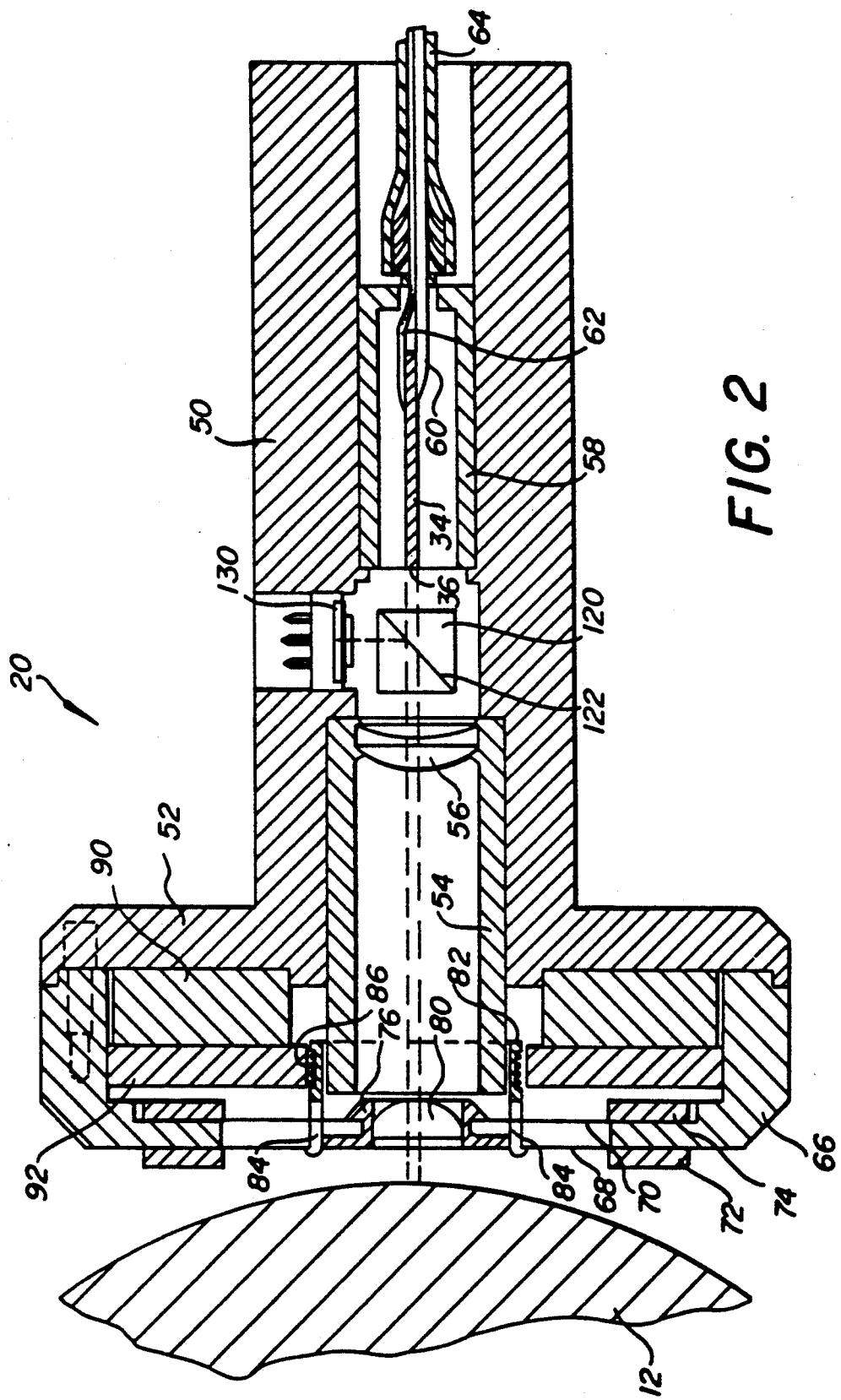
FIG. 2 is a sectional view of the writing head and lens taken along line 2—2 of FIG. 1.

A cross section of the writing head 20 is illustrated in FIG. 2 and comprises a generally cylindrical barrel portion 50 having a flange 52 at the drum end thereof. The interior of the barrel portion is arranged to accept a stationary lens barrel 54 at the writing end, containing a stationary lens 56. A printhead assembly 58 is selectively oriented within and at the opposite end of the barrel from the writing end. The printhead assembly comprises a tubular member selectively oriented within barrel portion 50 and contains a linear array of optical fibers which includes a planar fiber-supporting wafer or substrate 34 having a plurality of writing optical fibers 60 mounted on one face thereof and focusing optical fibers 62 on the opposite face thereof, as will be more thoroughly described hereinbelow. The writing optical fibers 60 have a writing end 36 facing the drum member 12 at one end of the barrel and extend from the other end of the printhead assembly out of the writing head barrel through a protective sheath 64 to the diode lasers, not shown.

A cup-shaped closure member 66 is arranged to mate with the flange 52 of the writing head barrel 50 and forms a housing for the focusing drive means, as will be described hereinbelow. The end of the closure member adjacent drum member 12 is provided with an axially disposed opening which is bridged by a pair of sheet flexure members, 68 and 70, mounted at the outer periphery thereof by annular plate means 72 and 74 to the closure member 66. The central portions of the sheet flexure members are mounted to a movable rigid cylindrical lens housing 76 which contains moveable lens 80. A cylindrical bobbin 82 is disposed around the end of stationary lens barrel 54 and is connected to the moveable lens housing 76 via equally spaced arms 84 which extend between the legs of the flexure members 68 and 70. A voice coil 86 is wound about the cylindrical portion of the bobbin 82 and is connected to a driving circuit, to be further described hereinbelow.

Also enclosed between the end closure 66 and flange 52 is a high power, toroidal magnet 90 and an annular magnetic plate 92 which are both disposed about and spaced from the end of stationary lens barrel 54. The voice coil portion of the bobbin 82 is disposed in the gap between the inner circumference of plate 92 and the outer circumference of stationary lens barrel 54. The dimensions of the magnet, the annular plate, the stationary lens barrel, and the bobbin are such that the bobbin can move freely axially of the lens barrel. The bobbin is supported in the gap by its attachement to the moveable lens housing 76 which is held in position by the plate flexures 68 and 70. It will be noted that the barrel portion 50, flange 52, the stationary lens barrel 54, and annular plate 92, are all formed of magnetic material, such as ordinary steel, so that in combination with the toroidal magnet 90, a strong magnetic field is created between the inner periphery of the annular plate 92 and the end of the stationary lens barrel 54. As a result, when a current is introduced into the voice coil 86 of the bobbin 82, as by a lens focusing circuit (not shown), an axial force is imparted to the bobbin and to the moveable lens housing 76, thereby selectively moving the moveable lens 80 along the optical axis of the assembly. Thus, with an appropriate focus detection system, to be described hereinbelow, the moveable lens assembly may be driven to assure that the output of the fiber optic array is maintained in focus at the appropriate position on the drum member 12, or on or within the writing element (not shown) mounted thereon.

Figure 3:
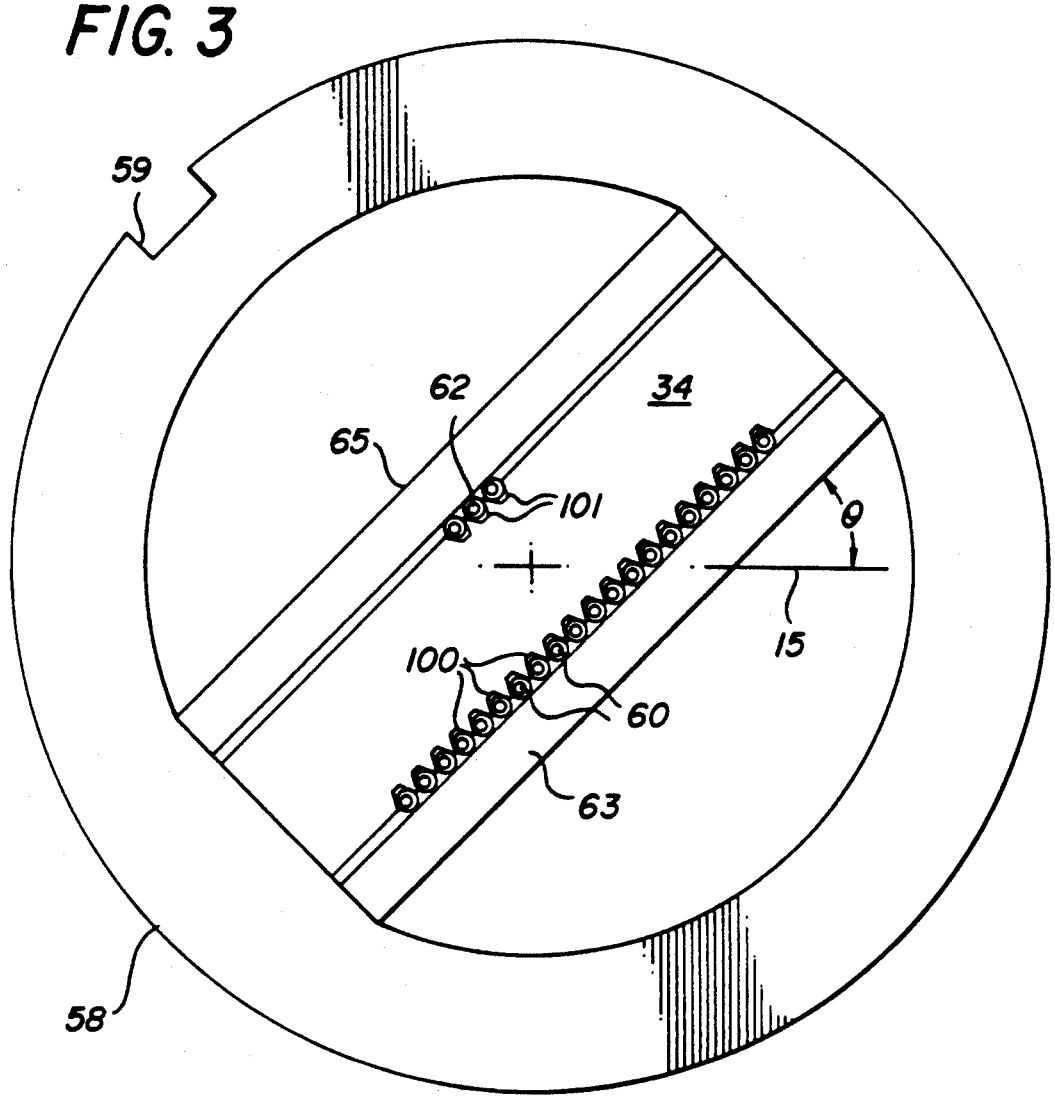
FIG. 3 is a greatly enlarged end view of the print head assembly.
Figure 4:
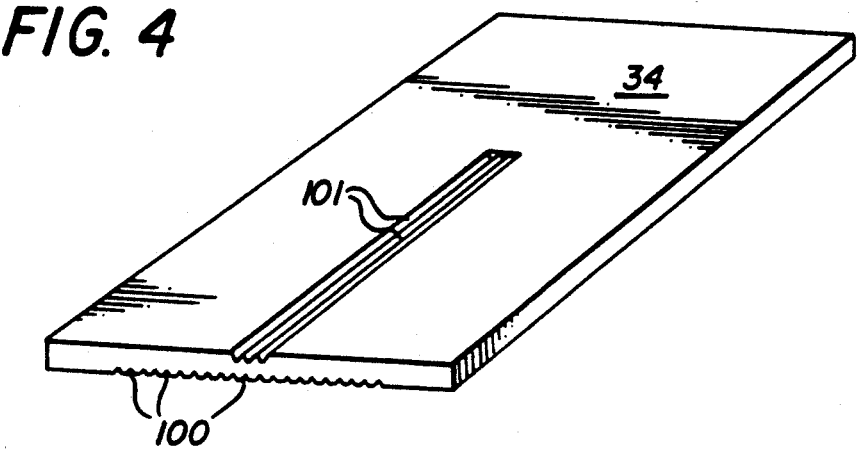
FIG. 4 is a perspective view of an optical fiber supporting substrate.

The fiber optic array (see FIGS. 2 and 3) comprises a plurality of fibers 60 which are each connected to a respective, remotely mounted diode laser, not shown. The diode lasers can be individually modulated to selectively project light from the writing end 36 of the optical fibers through the lens assembly, consisting of stationary lens 56 and movable lens 80, onto the thermal print medium carried by the drum member 12. The fiber optic array can be of the type shown in FIG. 3 and comprises optical fibers 60 which are supported on a first surface of the substantially planar substrate 34. The array may be of the type shown in co-pending, commonly assigned U.S. application Ser. No. 451,656, filed Dec. 18, 1989. Each of the optical fibers includes a jacket, a cladding, and a core, as is well known in the art. As disclosed in the copending application, the fibers extend from the laser diodes to the array and are mounted in sets of V-grooves 100 (FIG. 4) which are formed in the first surface of the substrate 34 so that the fibers at the writing end 36 are disposed as a linear array, substantially parallel and adjacent to each other in very close proximity, with the ends disposed in a common plane perpendicular to the fiber axes. In a preferred embodiment of the array, twenty writing fibers 60 are employed. As illustrated in FIG. 3, the substrate 34 is disposed in the tubular member 54 of the printhead assembly 58. The tubular member is provided with a keyway 59 which mates with a corresponding key (not shown) on the inner surface of barrel portion 50 so that the orientation of the linear array 60 is at a preselected angle $\Theta$ with respect to the drum axis 15. The orientation of the keyway 59 in the outer surface of the printhead assembly 58, the corresponding key on the interior of the barrel portion 50, and the photosensors 29 (see FIG. 1) disposed on diametrically opposite sides of the writing head axis, all correspond so that when the line connecting the two photosensors 29 is exactly parallel with the axis 15 of drum member 12, the writing angle of the linear array 60 is that which has been preselected for the particular apparatus.

The focus detection system comprises a second array of optical fibers 62 mounted in V-grooves 101 on the opposite surface of the substrate 34 with respect to the writing array 60. The focusing array 62 requires only a single fiber, but in practice, three fibers may be provided, with two as extras in case the first fiber fails. The focusing fiber is connected at its inlet end to a laser diode (not shown) which may be mounted in the same region with the writing diodes, but which is selected to produce a second beam of light having a wavelength different from the wavelength of the writing beam and preferably outside the range of 800 nm-880 nm. In the preferred embodiment the focusing light source produces a beam of light having a predominant wavelength of 960 nm. The writing and the focusing fibers, 60 and 62, are held in the respective V-grooves 100 and 101 by cover plates, 63 and 65, respectively, which extend over all of the fibers and are glued or otherwise adhered to the surfaces of the substrate 34.

In the preferred embodiment, the writing array is provided with power from laser diodes, each operating at a power level of 200 milliwatts. The writing array consists of twenty laser diodes, which supply twenty optical fibers, each with a core diameter of 50 $\mu$m, that are mounted on a first surface of the planar support substrate 34 at the writing head. The substrate has a thickness of approximately 1 mm, or about 1000 $\mu$m. The focusing beam is produced by a laser diode producing approximately 10 milliwatts of power which is transferred to the writing head through a focusing optical fiber 62, also having a diameter of approximately 50 $\mu$m, which is mounted on the opposite surface of the support substrate from the writing array. The focusing optical fiber is preferably centered along the length of the linear writing array, as will be further described hereinbelow. Thus, the focusing fiber is spaced from the closest writing fiber by a distance of approximately twenty diameters. Moreover, in the preferred embodiment, the support substrate is oriented so that the focusing fiber, with respect to the writing array, is disposed so that the focusing beam is projected onto the writing element ahead of the writing beam. As a result, the focusing beam is relatively unaffected by any thermal distortions of the donor element resulting from the heating thereof during the thermal writing process. Also, since the focus laser diode is of such a relatively low power output, there is little chance that the donor element will be thermally distorted by the focusing beam itself.

The focusing system also includes a beam splitter 120, having a semi-reflective buried surface 122, which is disposed between the writing end 36 of the linear array 60 and the stationary lens 56. A split cell photodetector 130 is disposed in the sidewall of barrel 50 and is arranged to receive the portion of the focusing beam which is reflected from the writing element and by the buried layer of the beam splitter. The photodetector is provided with a mask to shield the split cell from any part of the writing beam which may be reflected to the photodetector. The focusing fiber 62 is arranged to project the focusing beam through the image splitter 120, the focusing assembly comprising lenses 56 and 80, and onto the drum surface or the writing element disposed thereon. Because of the spatial separation of the focusing fiber from the linear array of the writing fibers at the writing head, the focusing beam is spaced from the writing beam at the writing element and, subsequently, at the photodetector. The focusing beam is reflected from the reflective surface of the receiver element back through the focusing assembly and into the beam splitter 120 wherein a portion of the reflected focusing beam is deflected by the buried layer into the split cell photodetector 130. In the preferred embodiment, photodetector 130 has a preferential wavelength sensitivity to the wavelength of the focusing beam, i.e. 960 nm. The signal from the photocell 130 is fed to a focusing circuit, not shown, which then generates an appropriate current which is supplied to the voice coil 86 on the bobbin attached to the movable lens element 80. In this way the focus detection system constantly monitors the location of a surface closely adjacent the surface of the writing element on which the writing beam is to be concentrated.

As noted above, the focusing fiber is preferentially located opposite the center of the writing array on the opposite surface of the support substrate. This assures that the focusing fiber is spaced from the writing element a distance which is substantially the same as the central writing fiber. Moreover, since the location of the focusing fiber is substantially closer to the axis of the focusing lens than would be the case were the focusing fiber mounted on the same surface of the substrate but spaced from the end of the writing array, a smaller, less expensive lens may be utilized with no loss of performance.

Further, it will be appreciated that, in an image writing apparatus according to the preferred embodiment, the writing array produces a total power at the writing element of 4 watts while the focusing beam has a power of only 10 milliwatts at the laser diode. After all of the losses of the two beams passing through the various elements of the writing and focusing system are considered, the power of the writing beam at the photodetector is approximately 1 milliwatt, while the focusing beam has a power of only 25 microwatts, one-fortieth the power of the writing beam. Yet the separation of the focusing beam from the writing beam makes it possible for the photodetector to be unable to determine whether or not the writing beam is turned on. Accordingly, the spacing of the focusing beam from the writing beam permits the focusing photocell to have a sensitivity that would not otherwise be possible without a significant increase in the output power of the focusing laser diode, with the attendant problems of increased power requirements and undesirable heat generation.

The invention has been described in detail with particular reference to a presently preferred embodiment, but it will be understood that variations and modifications can be effected within the spirit and scope of the invention.

What is claimed is:

1. In an imaging apparatus utilizing a writing element, a moveable writing head including means for generating a writing beam of light arranged to be projected onto said writing element to generate an image, and means for focusing said writing beam with respect to said writing element, said focusing means comprising means for generating a focusing beam of light to be projected onto said writing element and means for detecting said focusing beam, the improvement comprising means for projecting said focusing beam onto said writing element at a first projection point distinct from a second projection point of said writing beam.

2. An imaging apparatus according to claim 1 wherein said focusing beam is projected onto said writing element ahead of said writing beam.

3. An imaging apparatus according to claim 1 wherein said focusing beam is also separated from said writing beam at said detecting means.

4. An imaging apparatus according to claim 1 wherein said improvement also includes means for spatially separating said focusing beam from said writing beam at said writing head.

5. An imaging apparatus according to claim 4 wherein said means for spatially separating said focusing beam from said writing beam comprises a mounting means for both supporting and aligning both of said writing beam and said focusing beam generating means.

6. An imaging apparatus according to claim 4 wherein said writing beam comprises a plurality of beams arranged in a linear array, and said focusing beam comprises a smaller number of beams than the number of writing beams which are substantially centrally disposed with respect to said linear array of said writing beams.

7. An imaging apparatus according to claim 6 wherein said focusing beam comprises a single beam.

8. An imaging apparatus according to claim 6 wherein said means for spatially separating said focusing beam generating means from said writing beam generating means comprises a mounting means for both supporting and aligning both of said transferring means.

9. An imaging apparatus according to claim 8 wherein said focusing beam is projected onto said writing element ahead of said writing beam.

10. An imaging apparatus comprising:
    a writing element;
    a source of light arranged to project a writing beam of light onto said writing element to generate an image, said source of light including means for transferring said light to a movable writing head from whence it is projected onto said writing element;

means for focusing said writing beam with respect to said writing element, said focusing means comprising means for generating a focusing beam of light to be projected onto said writing element and means for detecting said focusing beam, said focusing beam generation means including means for transferring said focusing beam of light to said movable writing; and means for spatially separating at said writing head said focusing beam transferring means and said writing beam transferring means whereby said focusing beam is projected onto said writing element in spaced relation with respect to the projection of said writing beam onto said writing element.

11. An imaging apparatus according to claim 10 wherein said focusing beam is projected onto said writing element ahead of said writing beam.

12. An imaging apparatus according to claim 10 wherein said focusing beam is also separated from said writing beam at said detecting means.

13. An imaging apparatus according to claim 10 wherein said means for spatially separating said focusing beam transferring means from said writing beam transferring means comprises a mounting means for both supporting and aligning both of said transferring means.

14. An imaging apparatus according to claim 13 wherein said mounting means comprises a substantially planar support substrate.

15. An imaging apparatus according to claim 14 wherein said writing beam transferring means is supported and aligned on a first surface of said support substrate and said focusing beam transferring means is supported and aligned on the opposite surface of said support substrate.

16. An imaging apparatus according to claim 10 wherein said writing beam comprises a plurality of beams arranged in a linear array, and said focusing beam comprises a smaller number of beams than the number of writing beams which are substantially centrally disposed with respect to said linear array of said writing beams.

17. An imaging apparatus according to claim 16 wherein said focusing beam comprises a single beam.

18. An imaging apparatus according to claim 16 wherein said means for spatially separating said focusing beam transferring means from said writing beam transferring means comprises a mounting means for both supporting and aligning both of said transferring means.

19. An imaging apparatus according to claim 18 wherein said mounting means comprises a substantially planar substrate.

20. An imaging apparatus according to claim 19 wherein said writing beam transferring means is supported and aligned on a first surface of said support substrate and said focusing beam transferring means is supported and aligned on the opposite surface of said support substrate.

21. In an imaging apparatus utilizing a rotating carrier member arranged to carry a writing element, a source of light movable with respect to said writing element and arranged to project a writing beam of light onto said writing element to generate an image, said source of light comprising a plurality of laser diodes and a plurality of optical fibers connecting said diodes to a movable writing head adjacent said carrier member, said optical fibers in said writing head having output ends arranged in a linear array, the improvement comprising a substantially planar support substrate disposed in said writing head and arranged to support said output ends of said optical fibers on a first surface thereof, said substrate being provided with a plurality of grooves on said first surface with each groove receiving said output end of each fiber, and means for focusing said writing beam with respect to said writing element, said focusing means comprising a laser diode for generating a focusing beam of light to be projected onto said writing element and a photocell means, a focusing optical fiber connecting said focusing diode to said writing head, the end of said focusing optical fiber at said writing head being supported on the opposite surface of said substrate from said first surface substantially centrally of said linear array of said writing beam optical fibers whereby said focusing beam is projected onto said writing element ahead of said writing beam and is separated from said writing beam when it is detected by said photocell means.

22. In an imaging apparatus utilizing a writing element, a movable writing head including means for generating a writing beam of light arranged to be projected onto said writing element to generate an image, the method of focusing said writing beam with respect to said writing element comprising the steps of generating a focusing beam of light and projecting it onto said writing element, spatially separating said focusing beam of light at said writing element from said writing beam of light at said writing element, and detecting said focusing beam.

23. In an imaging apparatus utilizing a rotating carrier member arranged to carry a writing element, a source of light movable with respect to said writing element and arranged to project a writing beam of light onto said writing element to generate an image, said source of light comprising a plurality of laser diodes and a plurality of optical fibers connecting said diodes to a movable writing head adjacent said carrier member, said optical fibers in said writing head having output ends arranged in a linear array, the method of focusing said writing beam with respect to said writing element comprising the steps of generating a focusing beam of light, projecting said focusing beam from a location in said writing head spatially separated from but substantially centrally of said linear array onto said writing element, aiming said focusing beam ahead of said writing beam at said writing element, and reflecting said focusing beam from said writing element to a photocell where it remains separated from said writing beam.

24. An imaging apparatus according to claim 1 wherein said writing beam is a first wavelength which is different from a second wavelength of said focusing beam.

25. An imaging apparatus according to claim 24 wherein said means for generating a writing beam of light produces a beam of light having a writing wavelength in a range of 800 nm to 880 nm and said focusing means produces a beam of light having a focusing wavelength outside of said writing wavelength range.

26. An imaging apparatus according to claim 25 wherein said writing wavelength is 830 nm and said focusing wavelength is 960 nm.

27. An imaging apparatus according to claim 6 wherein said writing beam is a first wavelength which is different from a second wavelength of said focusing beam.

28. An imaging apparatus according to claim 27 wherein said means for generating a writing beam of light produces a beam of light having a writing wavelength in a range of 800 nm to 880 nm and said focusing means produces a beam of light having a focusing wavelength outside of said writing wavelength range.

29. An imaging apparatus according to claim 28 wherein said writing wavelength is 830 nm and said focusing wavelength is 960 nm.

* * * * *